(12) United States Patent
Busch

(10) Patent No.: US 8,613,564 B2
(45) Date of Patent: Dec. 24, 2013

(54) QUICK DISCONNECT SECUREMENT DEVICE

(76) Inventor: Christopher Busch, Manlius, NY (US)

( * ) Notice: Subject to any disclaimer, the term of this patent is extended or adjusted under 35 U.S.C. 154(b) by 213 days.

(21) Appl. No.: 13/091,576

(22) Filed: Apr. 21, 2011

(65) Prior Publication Data
US 2012/0266352 A1    Oct. 25, 2012

(51) Int. Cl.
*F16B 21/00* (2006.01)

(52) U.S. Cl.
USPC ......... 403/322.1; 403/325; 403/328; 24/3.11; 89/37.04

(58) Field of Classification Search
USPC .............. 403/321, 322.1, 325, 326, 327, 328; 24/3.12, 3.11, 595.1; 89/37.04; 2/2.5, 2/102
See application file for complete search history.

(56) References Cited

U.S. PATENT DOCUMENTS

| | | | |
|---|---|---|---|
| 5,201,858 A * | 4/1993 | Otrusina | 24/573.11 |
| 5,642,847 A * | 7/1997 | DeMeo et al. | 224/623 |
| 5,669,170 A | 9/1997 | Norris | |
| 5,673,836 A | 10/1997 | Bush | |
| 5,718,363 A | 2/1998 | Graves | |
| 5,730,342 A * | 3/1998 | Tien | 24/3.12 |
| 5,850,996 A * | 12/1998 | Liang | 24/3.5 |
| 5,991,925 A * | 11/1999 | Wu | 2/102 |
| 6,266,910 B1 | 7/2001 | Horine | |
| 6,325,258 B1 | 12/2001 | Verdugo et al. | |
| 6,363,532 B1 * | 4/2002 | Miller et al. | 2/102 |
| 6,517,133 B2 | 2/2003 | Seegmiller et al. | |
| 6,736,136 B2 * | 5/2004 | Chen-Lieh | 24/3.11 |
| 6,824,028 B2 * | 11/2004 | Mutai et al. | 224/271 |
| D562,549 S | 2/2008 | Bodnar | |
| D577,093 S | 9/2008 | White et al. | |
| 7,841,496 B1 | 11/2010 | Schweikert | |
| 8,166,694 B2 | 5/2012 | Swan | |
| 2002/0195472 A1 | 12/2002 | Hickman | |
| 2008/0209698 A1 * | 9/2008 | Colorado | 24/595.1 |
| 2010/0071168 A1 * | 3/2010 | Miller | 24/3.11 |
| 2011/0076095 A1 | 3/2011 | Storch et al. | |
| 2011/0083353 A1 * | 4/2011 | Mitchell | 42/71.01 |
| 2012/0030986 A1 | 2/2012 | Swan et al. | |
| 2012/0174286 A1 * | 7/2012 | McBride et al. | 2/102 |

OTHER PUBLICATIONS http://www.sandsprecision.com/category/products/weapon-retention/, p. 1, as of May 18, 2012.

* cited by examiner

*Primary Examiner* — Michael P Ferguson
(74) *Attorney, Agent, or Firm* — George R. McGuire; Blaine T. Bettinger; Bond Schoeneck & King, PLLC

(57) ABSTRACT

A quick disconnect device for detachably holding a long gun or other elongated emergency tool (EET). The quick disconnect device receives and captures the ball of a ball-and-stem structure that is attached to the EET. The quick disconnect device may allow the EET to rotate about the central axis of the stem, but otherwise prevents relative translational and rotational motion between the EET and the quick disconnect device. The quick disconnect device is especially suitable for mounting to clothing, such as a utility belt or a ballistic vest. the quick disconnect device allows the EET to be inserted without requiring the user to directly manipulate the quick connection device, but requires the user to manipulate some sort of mechanism on the quick connect device in order to release the EET.

3 Claims, 8 Drawing Sheets

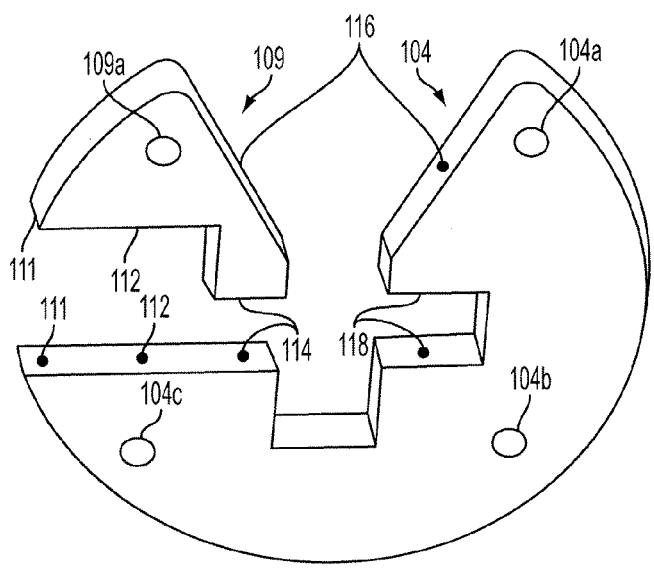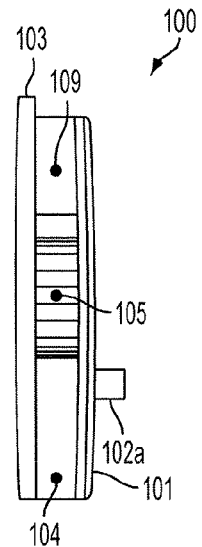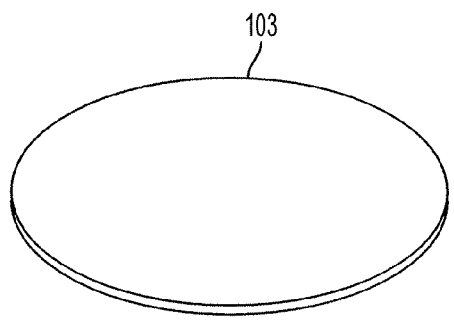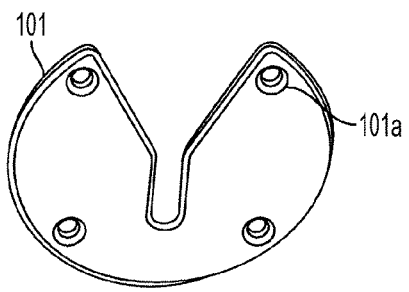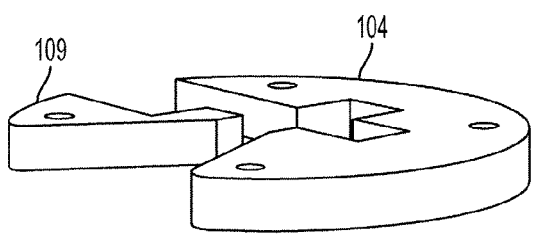

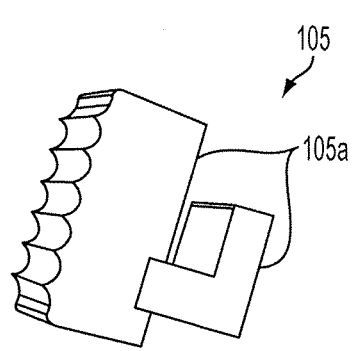
FIG. 12
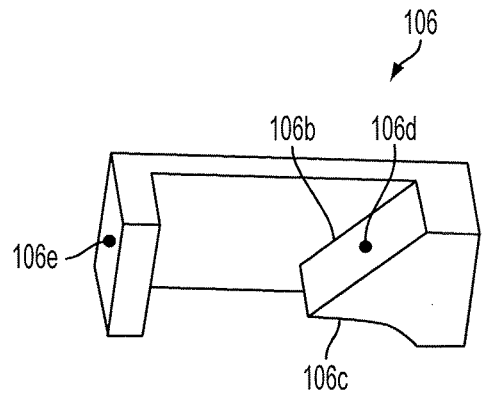
FIG. 13
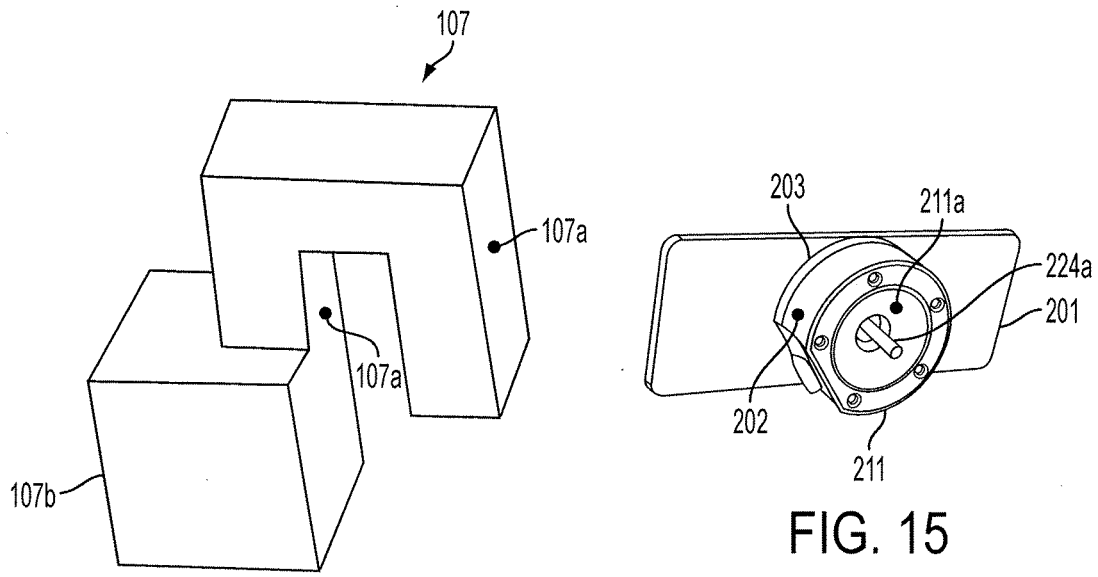
FIG. 14
FIG. 15

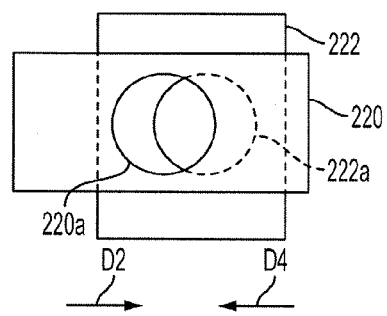
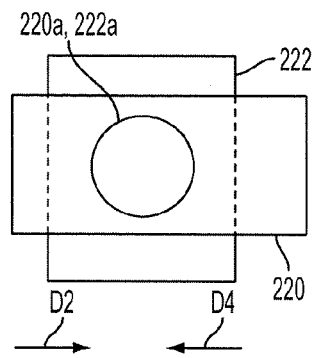
FIG. 16  FIG. 17
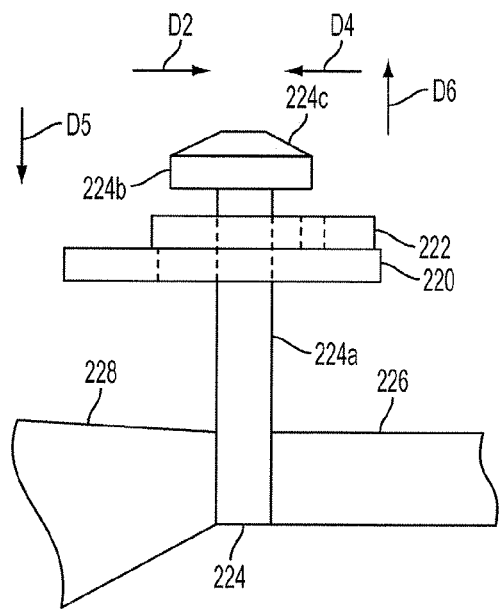
FIG. 18
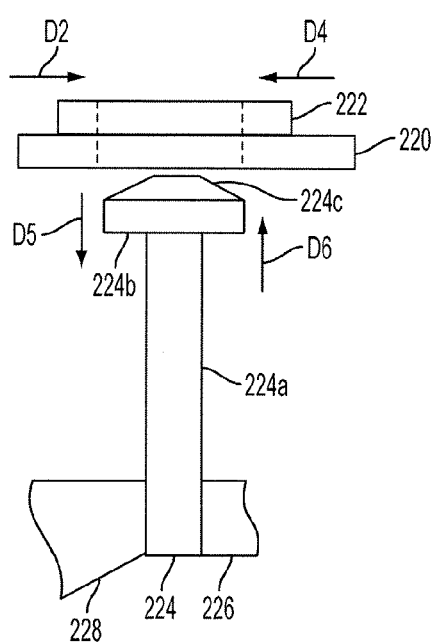
FIG. 19

QUICK DISCONNECT SECUREMENT DEVICE

BACKGROUND OF THE INVENTION

1. Field of the Invention

The present invention relates to a quick disconnect (see DEFINITIONS section) device for mechanically connecting objects to each other, more particularly to a quick disconnect device for elongated emergency tools (also herein called EETs, see DEFINITIONS section), and even more particularly to a quick disconnect device for connecting a long gun (see DEFINITIONS section) to a piece of clothing (see DEFINITIONS section) without translational play (see DEFINITIONS section) between the long gun and the clothing.

2. Description of the Related Art

EETs, and especially long guns, can be carried in a case, but this is not really appropriate for emergency situations where quick access to the long gun may be required. Long guns may be carried in the user's hands, but this is not comfortable for long periods of time, can interfere with walking or running and also occupies the user's hands so that they cannot be used for other tasks (for example, looking thru binoculars).

Therefore, when a user is going to carry a long gun over some distance or for some time, the most popular conventional way of doing this is with a sling. In the most popular sling design: (i) the long gun is connected at two spaced apart points to a strip of pliable fabric; and (ii) the strip fabric is mounted over the user's shoulder. The strip may be "mechanically connected" to the user's shoulder simply by the gravity of the long gun forcing the strap into a loose friction fit with the user's shoulder. There may also be slings that connect more rigidly to the user's clothing through connection hardware. However, even to the extent that these type of sling assemblies exist, the long gun is still free to translate and rotate in all three orthogonal directions because the pliable fabric will freely bend and sway in order to allow the connection points between the fabric strip and the long gun to freely move in space with six degrees of freedom, even if these connections are rigid connections in and of themselves.

There are other types of conventional slings that attach to various other points on a user's clothing, but what sling designs generally have in common is that one or more pieces of pliable fabric is in the mechanical connection between the long gun and the user's clothing so that the long gun will have translational play relative to its attachment point(s) on the user's clothing.

U.S. patent application 2011/0076095 ("Storch") discloses a quick release attaching device that can form a mechanical attachment to a long gun. More specifically, the Storch device, shown in FIGS. 1 to 8 of Storch detachable attaches to a rail of a long gun. This rail is best shown at FIG. 8, reference numeral 3 of Storch. The rail extends outward from the exterior surface of the firearm (see Storch at FIGS. 1 and 2A and corresponding portions of its specification). As best shown in FIG. 8, reference numeral 3 of Storch, the rail is elongated in a direction parallel to the direction of elongation of the long gun so that the rail does not extend much in height relative to its length and width. The rail does have a protrusion at its top end, such that the width of the top end of the rail is greater than the width of the lower portion of the rail. However, as best shown at FIG. 8, reference numeral 3, the protrusion extends only in the width direction so that there is no protrusion in the length direction of the rail (that is, in the direction of elongation of the long gun). To put it another way, the protrusion does not extend all of the way around the rail within a plane normal to the height direction of the rail. When the rail of a firearm is attached to the Storch quick disconnect device, the long gun is rigidly attached to the rail. When the Storch long gun is connected: (i) it has no translational play relative to the quick disconnect device of Storch, and (ii) it cannot rotate relative to the quick disconnect device. Storch does disclose that its quick disconnect device may be fixedly mounted to a structure, such as a building wall or a vehicle wall. Storch does not disclose that its quick disconnect device can be mounted to a user's clothing.

The following published documents may also include helpful background information: (i) U.S. Pat. No. 562,549 ("Bodnar"); (ii) U.S. Pat. No. 7,841,496 ("Schweikert"); (iii) U.S. Pat. No. 5,673,836 ("Bush"); (iv) US patent application 2002/0195472 ("Hickman"); (v) U.S. Pat. No. 5,669,170 ("Norris"); (vi) U.S. Pat. No. 6,266,910 ("Horine"); (vii) U.S. Pat. No. 577,093 ("White"); (viii) U.S. Pat. No. 5,718,363 ("Graves"); (ix) U.S. Pat. No. 6,325,258 ("Verdugo") and/or (x) U.S. Pat. No. 6,517,133 ("Seegmiller").

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

One aspect of the present invention is directed to a quick disconnect device for supporting an EET where the device has connection hardware for detachably attaching to a ball-and-stem structure (see DEFINITIONS section) on the EET in a quick disconnect fashion (see DEFINITIONS section). In preferred embodiments, the attachment between the device and the ball and stem structure is such that: (i) the EET and quick connect device can rotate with respect to each other about the central axis of the stem; but (ii) the EET and quick connect device cannot move substantially with respect to each other in any other directions. This can facilitate embodiments of the present invention where the quick connect is substantially rigidly attached to the user's clothing because: (i) long gun style EETs can be structured so that the gun will rotate about the central axis of the stem under gravitational forces to be pointed downward; and (ii) the user can rotate the long gun style EET about the central axis of the stem for various purposes (such as, comfortable detachment of the long gun style EET from the quick disconnect device, holding the long gun style EET in a low ready position, holding the long gun style EET in a shooting position, knee knocks into EET while running, and so on). In some preferred embodiments under this aspect, the quick disconnect device will further include guide hardware with a set of narrowing surface(s) to guide the ball-and-stem structure on the EET into a position for detachable attachment to the quick disconnect device.

In another aspect of the present invention, a quick disconnect device is structured so that: (i) a user must actuate by hand a user actuation component of the quick disconnect device in order to release the connection between the EET and the device; but (ii) the user can attach the EET back into quick connect device without actuating by hand any components on the Quick disconnect device. In preferred embodiments, the user must apply two different motions to the quick disconnect component in order to release the quick disconnect mechanical connection between the EET and the device. In preferred embodiments, the two different motions are: (i) a linear motion in a first direction, and (ii) a linear motion in a second direction (which is different from the first direction). In preferred embodiments, the first direction is parallel to an insertion direction for the EET relative to the device and the second direction is perpendicular to the first direction.). In some preferred embodiments under this aspect, the quick disconnect device will further include guide hardware with a set of guide surface(s) to guide the ball-and-stem structure on the EET into a position for automatic attachment of the EET to the quick disconnect device.

In another aspect of the present invention, a quick disconnect assembly includes: a wearable article of clothing; a quick disconnect device; and clothing-connection hardware. the clothing connection hardware is structured to mechanically connect the quick disconnect device to a portion of a major surface of the article of clothing. In preferred embodiments: (a) the quick disconnect device is suitable for forming a quick disconnect connection to a suitably equipped EET (for example, an EET having a ball-and-stem structure; and (b) the detachable, quick-disconnect attachment between the device and the EET is such that: (i) the EET can rotate with respect to the quick disconnect device about an axis perpendicular to the portion of the major surface of the article of clothing that is directly mechanically connected to the quick disconnect device; but (ii) when, connected the EET and quick connect device cannot move substantially with respect to each other in any other directions.

According to one aspect of the present invention, a quick disconnect device can detachably mechanically connect to a ball-and-stem structure, which includes a ball portion and a stem portion, extending from and mounted to an EET. The device includes: a device frame; and ball-capturing hardware. The ball-capturing hardware is mechanically connected to the device frame. The ball capturing hardware is connected, structured, located, sized and/or shaped to form a ball-capturing recess that is moveable between at least an open position and a closed position, with: (i) the open position being sufficiently open to allow the ball portion of the ball-and-stem structure of the EET can pass freely into and out of the ball-capturing recess, and (ii) the closed position being sufficiently closed to prevent the ball portion of the ball-and-stem structure of the EET to pass freely into and out of the ball-capturing recess.

According to a further aspect of the present invention, a quick disconnect device can detachably mechanically connect to an EET at an EET connecting portion. the device includes: a device frame; a connection hardware set; and a user actuation hardware set. The connection hardware set and the user actuation hardware set are mechanically connected to the device frame. The connection hardware set is structured, located, sized, shaped and/or connected to form a quick disconnect mechanical connection with the EET connecting portion when the EET connecting portion is inserted into the connection hardware by a user and without any manipulation of the user actuation hardware set by the user. The user actuation hardware set and connection hardware set are structured, connected, sized, shaped and/or located so that the user can actuate the actuation hardware set to force the connection hardware set to release the quick disconnect mechanical connection with the EET connecting portion in a quick disconnect manner.

According to a further aspect of the present invention, a clothing assembly is wearable by a user and is for use with an EET that includes an EET connecting portion. The assembly includes: an article of clothing; a first connection hardware set; and a quick disconnect device. The article of clothing includes a mounting portion. The mounting portion of the clothing comprises a major exterior surface. The first connection hardware set is structured, located, sized, shaped and/or connected to at least substantially rigidly mechanically connect the quick disconnect device to the mounting portion. The quick disconnect device includes a second connection hardware set. The second connection hardware set is structured, located, sized, shaped and/or connected to form a quick disconnect mechanical connection to the EET connecting portion so that there is no substantial translational play between the EET connecting portion and the quick disconnect device.

BRIEF DESCRIPTION OF THE DRAWINGS

The present invention will be more fully understood and appreciated by reading the following Detailed Description in conjunction with the accompanying drawings, in which:

FIG. 3 is a perspective view of a portion of the first embodiment device;

FIG. 4 is an orthographic side view of the first embodiment device;

FIG. 5 is a perspective view of another portion of the first embodiment device;

FIG. 6 is a perspective view of another portion of the first embodiment device;

FIG. 7 is a perspective view of another portion of the first embodiment device;

FIG. 12 is a perspective view of another portion of the first embodiment device;

FIG. 13 is a perspective view of another portion of the first embodiment device;

FIG. 14 is a perspective view of another portion of the first embodiment device;

FIG. 15 is a perspective view of a second embodiment of a quick disconnect device according to the present invention;

FIG. 16 is an orthographic front view of a portion of the second embodiment device in a closed position;

FIG. 17 is an orthographic front view of a portion of the second embodiment device in an open position;

FIG. 18 is an orthographic top view of a portion of the second embodiment device in a closed position along with a detachably attachable EET;

FIG. 19 is an orthographic top view of a portion of the second embodiment device in an open position along with a detachably attachable EET;

DETAILED DESCRIPTION OF THE INVENTION

Figure 1:
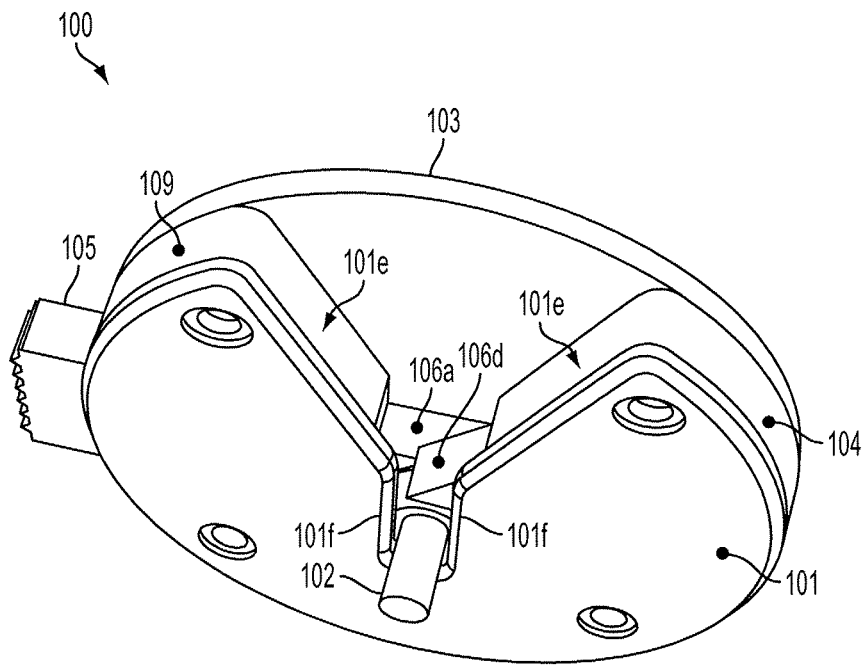
FIG. 1 is a perspective view of a quick disconnect device according to a first embodiment the present invention.

FIGS. 1-9 show a quick disconnect device 100 according to the present invention including. front plate 101; back plate 103; first intermediate plate 104; user actuation lever 105; recess closing member 106; force transfer member 107; first coil spring 108; second intermediate plate 109; and second coil spring 110. Plate 104, plate 109, plate 101 and plate 103 define: lever opening 111; first guide channel 112; second guide channel 114; and third guide channel 116. Plate 104, plate 101 and plate 103 define fourth guide channel 118. Plate 101 includes countersunk screw holes 101a to 101d, guide lips 101e and recess closure lip 102f. Plate 104 includes screw holes 104a to 104c. member 106 includes: low profile portion 106a; protrusion 106b; recess closure surface 106c; and ball-entry receiving surface 106d. FIGS. 1, 2, 8A, 8B, 10 and 11 show a ball-and-stem structure 102 (including stem 102a and ball 102b) that is suitable to: (i) attach to an EET; and (ii) form detachable quick connect style mechanical connections with device 100.

Figure 10:
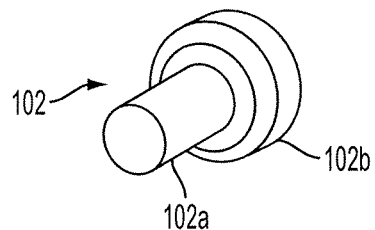
FIG. 10 is a perspective view of another portion of the first embodiment device.
Figure 11:
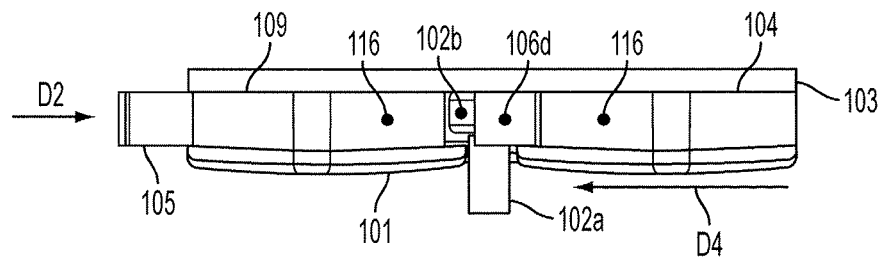
FIG. 11 is an orthographic top view of the first embodiment device.

Device 100 moves between three positions as follows: (i) the fully closed position; (ii) the entry-open position; and (iii) the released-open position. FIG. 1 shows device 100 in the fully-closed position as viewed from above, generally as it would be viewed by a user wearing a vest (not shown) where backing plate 103 was mechanically connected to the front of the vest. As shown in FIGS. 1, 10 and 13, in the fully-closed position, ball 102b of ball-and-stem structure 102 is held captive in a ball-capturing recess formed by backing plate 103, recess closure surface 106c of protrusion 102b and recess closure lip 102f. This closed recess permits the ball-and-stem structure (and the EET attached to it) to rotate with respect to device 100 about the central axis of the stem, but otherwise prevents substantial translational and/or rotational motion of the ball-and-stem structure relative to the device.

FIG. 1 also shows how the ball-and-stem structure can be inserted into the device so that it forms a detachably attachable mechanical connection therewith. As shown in FIGS. 1 and 3, third guide channel 116 is formed primarily by plates 109 and 104, with some help from guide lips 101e and backing plate 103. The idea is that by manipulating an EET equipped with a ball-and-stem structure, the user can easily make the detachable attachment between the EET and the device.

More specifically, first the user inserts the ball somewhere into the wide top portion of third guide channel 116 by moving the EET so that it remains generally parallel to the major surfaces of the device while being moved in a direction generally normal to the major surfaces so that the ball strikes the backing plate anywhere in the wide region at the top of third guide channel 116. The wideness of the exposed backing plate at the top of the third channel is helpful in allowing the user to get the attachment process started without being required to move the EET in a manner that is too precise or accurate.

Then, the user moves the EET generally along the direction of the third channel. For example, this would be a generally downwards direction if the user had the device mounted on her vest so that the third channel pointed directly upwards. Once again, this motion need not be too precise. This is because as the user moves the EET and its ball in the general direction of the third channel, the backing plate, the opposed, inclined surfaces on intermediate plates 104, 109 and the lips 101e may bear on the ball and/or stem to guide and direct the motion of the ball gently and incrementally so that it will go smoothly into the narrow lower part of the third channel.

It is noted that the relative lack of accuracy and precision required by the narrowing surfaces of the third channel can be extremely helpful in an emergency situation. As one example, a law enforcement officer ("LEO") may approach an active crime scene with her long gun out, but may want to store her gun in device 100 mounted on her vest when she eventually approaches the suspect to handcuff her for purposes of completing an arrest. However, during the critical interval while the long gun is being inserted into device 100, the LEO will not want her attention to be too distracted by the process of getting the ball inserted into the device. The present invention allows insertion of the EET with a low level of attention both through its use of a ball-and-stem attachment structure on the EET, but also through the narrowing channel. In the example of device 100, the third guide channel is linear (that is, centered about a straight line). In other embodiments, the channel may be non-linear. In some non-preferred embodiments the channel may not be a narrowing channel at all. For example, a quick disconnect device mounted on the wall in a secure area of the police station would not necessarily need to be built for super-easy insertion, and might omit the third guide channel all together. Tactical considerations, now known or to be developed in the future, may lead to all sorts of variations on the present invention.

Figure 2:
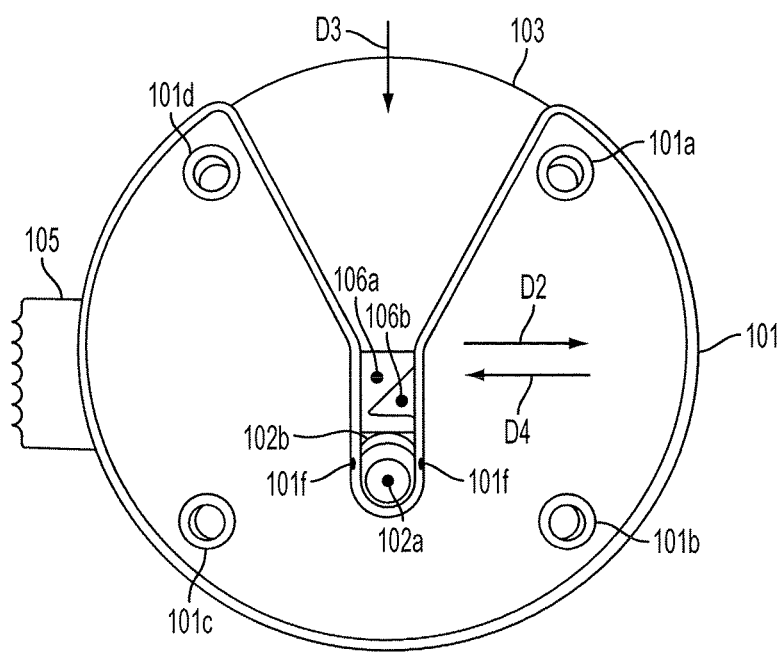
FIG. 2 is an orthographic front view of the first embodiment device.

Returning to the detailed explanation of the insertion of ball 102b and stem 102a into device 100, when the ball has been moved and guided to the bottom of third channel 116, then the ball will hit ball-entry receiving surface 106d of recess closing member 106. This marks the beginning of device 100 moving from its fully closed position to its entry-open position. Downward force (see FIG. 2 at direction D3) exerted by the ball through inclined surface 106d will tend to force protrusion 106b in a direction away from the third channel (see FIG. 2 at direction D2). Once this protrusion is forced out of the way, the device is in the entry open position and ball 102b is free to move into its attachment position with respect to device 100 (as shown in FIGS. 1 and 2). In the attachment position, recess closing member 106 and its protrusion 106b in the d4 direction 9 see FIG. 2) so that protrusion 106b of recess closure member 106 moves back to a position under the third channel and over the recess where the ball is now held captive. It is noted that when protrusion 106b is forced in the D2 direction, it is being forced against a bias (preferably imparted by a coil spring). This bias must be controlled so that it is not too large such that the ball is difficult to insert, but also so that it is large enough to reliably maintain the ball-capturing recess in its fully closed position after the ball has been captured.

Now that the attachment of the EET to device has been explained, the process of releasing the device from its fully closed position to its released-open position, in order to release the EET, will now be explained primarily with reference to FIGS. 8A and 8B. Before entering a discussion of the mechanics, it is noted that many preferred embodiments of the present invention should not be too difficult to release, but also not too easy to release. This is because of the nature of many of the emergency situations into which devices and EETs according to the present invention may be deployed. On the one hand, an LEO or a combat soldier may need to get his long gun out of the device very quickly to counter the actions of an enemy or a suspect. That is why, for instance, the present invention relates to a quick connect device that does not require the use of tools to release the long gun. On the other hand, the long gun should not be too easy to accidentally release, or be too easy to release by an enemy or suspect who wants adverse control of the long gun for himself. That is why preferred embodiments of the present invention will require two different and distinct motions in order to move the quick release device from its fully closed position to its released-open position. These two motions are motions made to some part(s) on the device itself and are in addition to any motion that will still be required to physically actuate the long gun out of the device so that its ball is physically freed from its captivity. While these two different and distinction motions might tend to slow the release of the long gun somewhat, they are believed to be simple enough to be sped up by training, so that the emergency zone worker will have a distinct advantage over enemies and suspects when it comes to getting control of the long gun when it is initially attached to the quick connect device of the present invention.

Figure 8A:
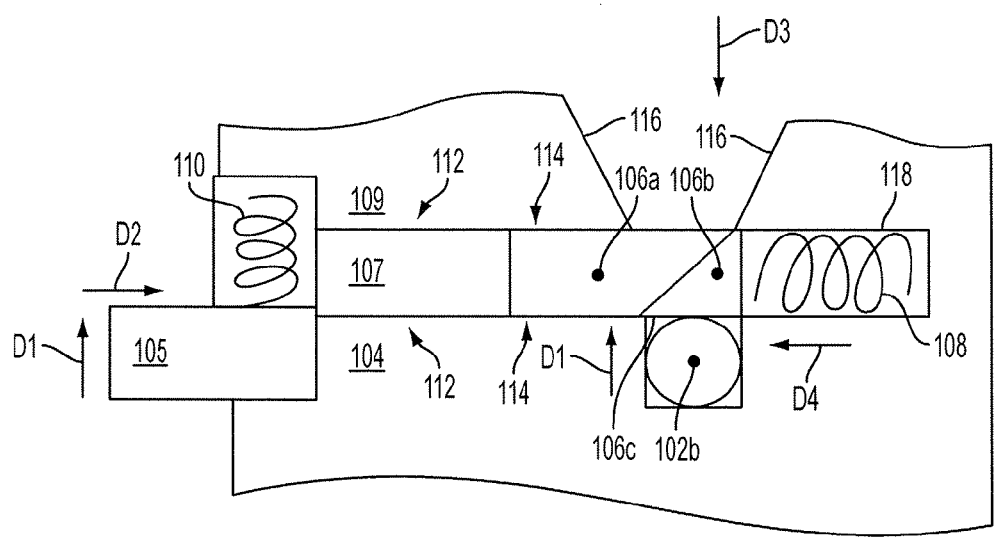
FIG. 8A is a schematic view of the first embodiment device in a biased closed position.

Moving now to FIG. 8A, this shows the inner workings of device 100 when it is in its fully closed position, holding captive ball 102b, which has previously been moved in the D3 direction down through third channel 116. In this position spring 108, positioned in fourth channel 118 provides the D4 direction bias that maintains protrusion 106b over ball 102b in order to close the recess and to constrain (with respect to certain degrees of freedom as explained above) ball 102b with respect to device 100. When in this fully closed position, low profile portion 106a of recess closure member 106 is forced into second channel 114, which forces force transfer member 107 fully back into first channel 112, which, in turn, forces user actuation lever 105 partially out of the body of the device. Spring 110 further forces the user actuation lever downwards in the D3 direction so that it occupies the relative position shown in FIG. 8A.

Figure 8B:
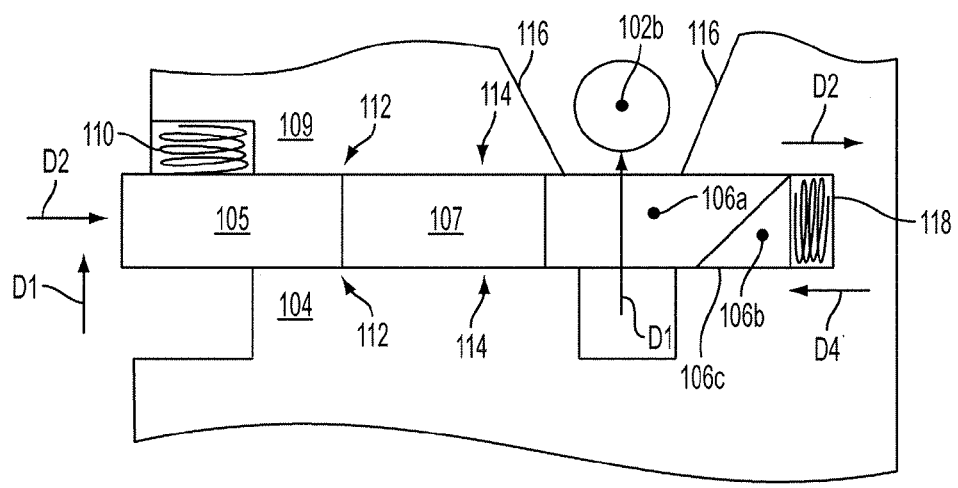
FIG. 8B is a schematic view of the first embodiment device in a fully forced open position.
Figure 9:
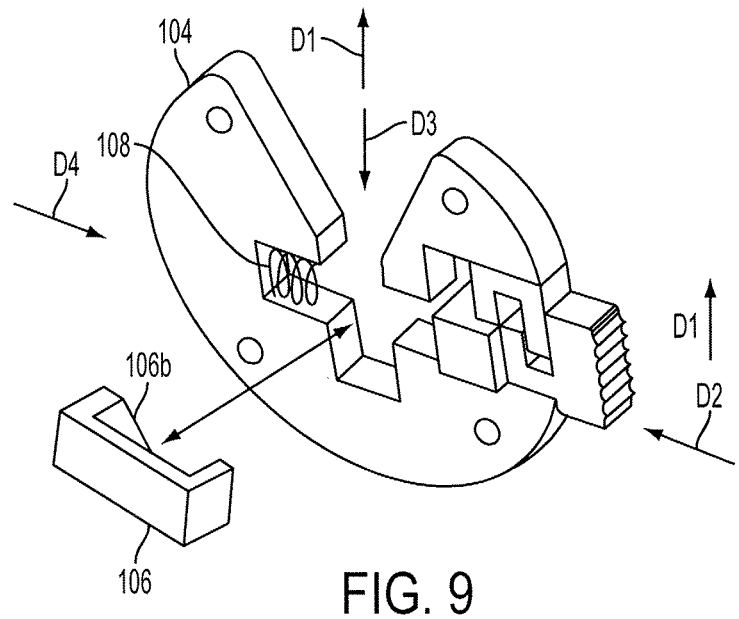
FIG. 9 is a perspective view of another portion of the first embodiment device.

In order to release her EET, the user moves device 100 from the fully closed position of FIG. 8A to the released-open position of FIG. 8B. More specifically, first the user actuates the user actuation lever in the D1 direction so that it becomes aligned with first channel 112. This D1 direction motion is made against the bias of spring 110. At this point, protrusion 106b will still be biased into position over the ball and will still maintain the ball-capturing recess closed. then, the user further actuates user actuation lever in the D2 direction. This motion: (i) forces force transfer member 107 in the D2 direction into second channel 114; (ii) forces recess closure member in the D2 direction out of the second channel so that low profile portion 106 is located over the ball; (iii) releases the ball by opening the ball-capturing recess up at its top end; and (iv) moves spring 108 against its bias. The EET can now be lifted in the D1 direction up and out of device 100, as shown in FIG. 8B.

After the EET has been removed, the user can remove her hand from the user actuation lever and apply it to manipulation of the EET (for example, using that hand to help aim a long gun at a dangerous suspect). When the user removes her hand from the actuation lever: (i) spring 108 will force components 106, 107 and 105 back in the D4 position; and (ii) spring 110 will force the user actuation lever back in the D3 direction; and (iii) so that device 100 returns to its fully closed position.

The actual piece parts used to accomplish the actions described above in connection with FIGS. 1, 2, 8A and 8B can be seen (non-schematically) in FIGS. 3-7, 9 and 10-14. The geometry of some of the parts is rather complex, but it is noted that the present invention is not necessarily limited to the preferred geometries shown in these Figures. In this embodiment, the two user motions required to release the device are both translational (as opposed to rotational) motions, but this is not necessarily true for every embodiment of the present invention that requires two motions. In this embodiment, the two translational user motions are directed at right angles to each other, but this is not necessarily true for every embodiment of the present invention that requires two translational motions. In this embodiment, only two user motions are required to release, but some embodiments may require three or four distinct motions. However, if the number and type of motions become as numerous and difficult, in the aggregate, as the opening of a typical combination lock, then at some point the device would no longer qualify as a quick release device. However, two to four (or even more) simple motions will not generally take the device out of the realm of quick disconnect devices.

FIGS. 15 to 19 show quick disconnect device 200 including: wall mounting plate 201; intermediate plate 202; back plate 203; front plate 211 (including first channel defining surface 211a); recess closure member 220; and ball-engaging member 222. FIGS. 15, 18 and 19 show a long gun style EET equipped for use with quick disconnect device including ball-and-stem structure 224 (including stem 224a, lower ball portion 224b and upper ball portion 224c); gun stock 228 and gun receiver 226. Member 220 includes aperture 220a. member 222 includes aperture 222a.

As best shown in FIG. 15, with device 200, the ball-and-stem structure of the EET is inserted in a direction directly toward the major surfaces of the device (that is perpendicular to the plane of wall mounting plate 201), rather than parallel to the major surfaces (as was the case for device 100). Device 200, like device 100, has a set of narrowing guide surface(s) for guiding the ball into a ball-capturing recess, but, in device 200, this surface is shaped as a shallow cone 211a, instead of the narrow pyramid geometry of third channel 116 of device 100. One important point is that there are a wide range of different geometries that can receive an EET's ball-and-stem structure in a detachably attachable manner.

The manner in which the ball-capturing recess is formed is also somewhat different in device 200, as compared to device 100 as will now be explained in connection with FIGS. 16 to 19. As shown in FIGS. 16 and 17, two pieces 220, 222 inside of device 200 move relative to each other in the D2 and D4 directions between: (i) the closed position of FIG. 16 where the two holes 220a, 222a are out of alignment; and (ii) the open position of FIG. 17 where the holes 220a, 222a are in alignment. As shown in FIGS. 18 and 19: (i) when the two holes are aligned, the ball-capturing recess is sufficiently closed so that the ball is captured and the EET is detachably attached to device 200; and (ii) when the two holes are not aligned, the ball-capturing recess is effectively opened so that the ball can be inserted into (in the D6 direction) or detached from (in the D5 direction) device 200. As with device 100, there is a bias so that the holes 220a and 222a are not aligned unless some type of force is applied. As with device 100, during ball entry this force comes from the ball. As shown in FIGS. 18 and 19, upper portion 224c of ball-and-stem structure 224 is beveled so that it can force the holes into alignment, against the bias(es), as it is being inserted into device 200. Further as with device 100, when the ball-and-stem structure is being disconnected, the user must apply the force to counter the bias and must do this by applying two distinct and different motions to a user actuation mechanism located in or on device 200. Note that the lower ball portion 224b is not beveled in order to prevent D5 direction forces on the ball-and-stem structure from opening the ball-capturing recess up after the ball has been captured and device 200 has been moved back into the closed position.

Many variations on this idea of using alignment of two holes to close the ball-capturing recess are possible. For example, the holes may be different sizes (although both holes must be sufficiently large to let the ball get in and out). If one hole is much larger than the other, then they do not have to be in perfect coaxial alignment. For example, it may be sufficient if the smaller hole comes into the footprint of the larger hole. If both holes are sufficiently large then the holes may merely overlap (and not totally coincide) even in the open position, so long as the overlap in the open position is sufficiently large to allow passage of the ball. As further variations, piece 222 may move relative to the housing of device 200 or piece 220 may move relative to the housing of device 200 or both pieces may move. As another variation, in this geometry with overlapping holes that move in the radial direction with respect to each other, the holes could be shaped as slots, rather than full 3600 degree holes.

Another possible variation on devices 100 and 200 is that the ball and/or stem and the ball-capturing recess could be shaped so that the ball-and-stem structure cannot rotate about its central axis when the ball is captured in the ball-capturing recess. As a simple example, imagine that the transverse cross-sectional shape of stem 224a matched the shape of the overlap of holes 220a and 222a as shown in FIG. 16. In this case, the stem would not be circular and the shape of the recess surrounding the stem would also not be circular. This would prevent the stem (and the ball and the EET) from rotating about the central axis of the stem. This additional constraint may be bad for some applications of the present invention, such as vest mounted quick disconnect systems, but it might also be advantageous in other applications, such as where a long gun is mounted inside a police vehicle and should not be rotating around like a propeller under the normal inertial and vibrational forces cause by riding in a motor vehicle. As mentioned above, the stem could be the element directly constrained against this rotational motion, or the ball, or both. Alternatively, prevention of rotation could be performed, where desired, by exterior components, like bracket(s) mounted inside the police vehicle, spaced apart from the ball-and-stem type quick disconnect device.

Before moving away from the discussion of the mechanics of the quick disconnect device, one final point will be made. That is the point that the EET connection hardware (which happens to be a ball-and-stem structure in the preferred embodiments of device 100 and device 200) can be inserted without having the user manipulate any controls on or in the quick disconnect device, but requires the user to actuate a control on the device to release the EET mounted connection hardware. In other words, the detachable attachment hardware can be opened in two different ways: (i) by forcing EET connection hardware to enter the device (generally by manipulating the body of the EET in a controlled manner); and (ii) by actuating a user actuation mechanism on or in the device to release the EET connection hardware. This feature of the preferred embodiments may extend beyond systems that use a ball-and-stem architecture. For example, some embodiments of the present invention may have a set of rigid arm(s) and or retention pin(s) which: (i) wrap around the stock or the receiver assembly itself; (ii) can be opened to receive the long gun merely by forcing the long gun into the arms; (iii) will securely grip the long gun after it is inserted (preferably allowing it to rotate freely about a central axis defined by the quick disconnect device while forbidding other types of translational and/or rotational motion); and (iv) which will release the long gun only by having the user actuate a mechanism on the quick disconnect device (preferably actuation by at least two distinct and different motions would be required). In fact, in some embodiments, the purely mechanical operation of preferred devices 100 and 200 may not be required. For example, an electrically operated solenoid could be used to capture and release EET connection hardware in the form of an eye-bolt in a manner where: (i) the eye bolt can be inserted into the quick disconnect device without directly manipulating the quick disconnect device; but (ii) direct user manipulation of the quick disconnect device (preferably two motions) is required to retract the solenoid and release the eye-bold and its attached EET.

Figure 20:
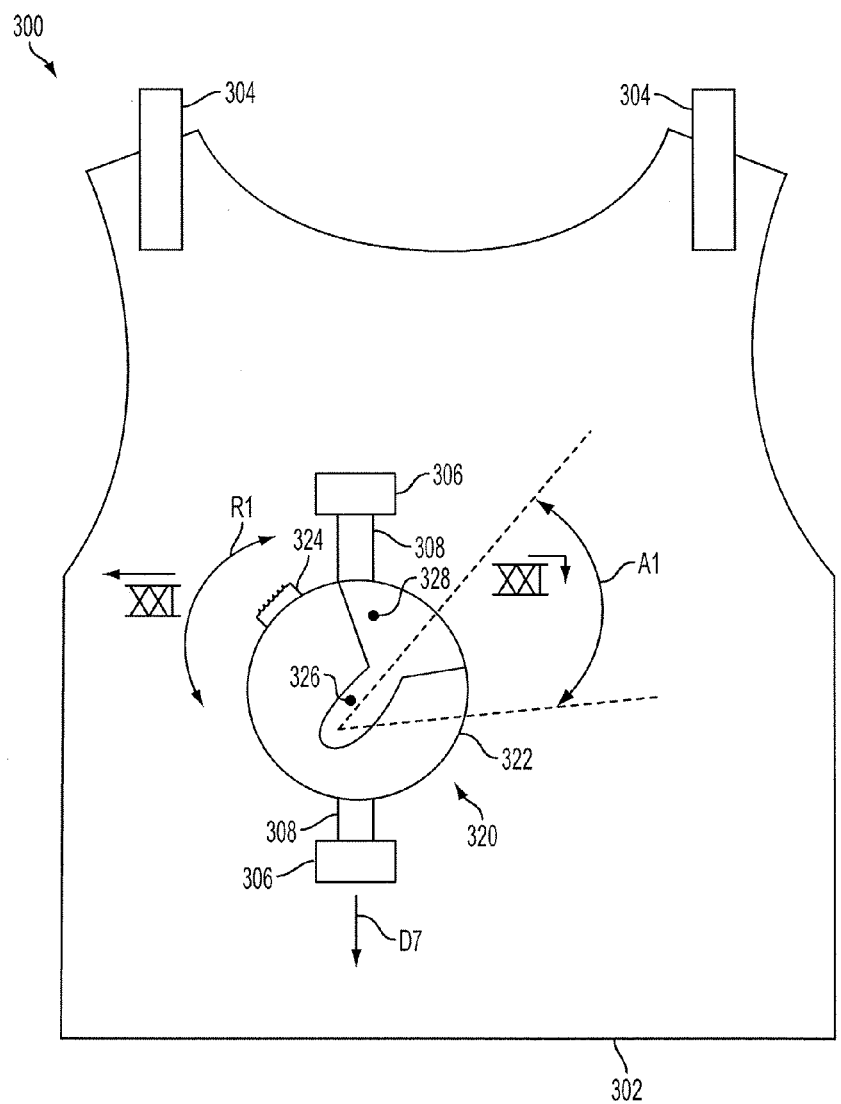
FIG. 20 is a first embodiment quick disconnect article of clothing assembly according to the present invention.
Figure 21:
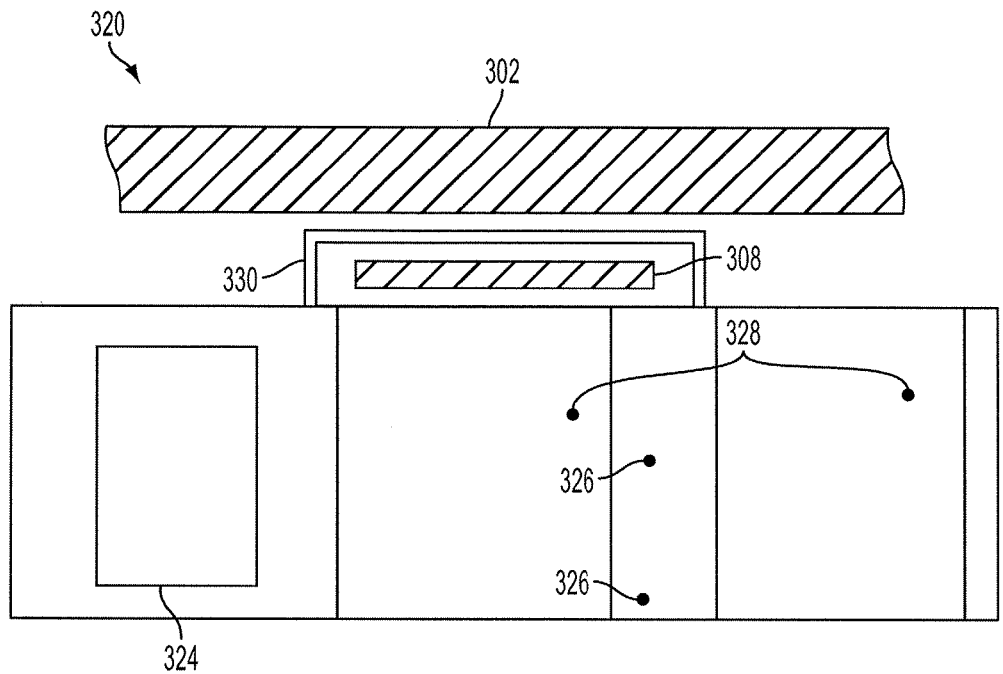
FIG. 21 is a partial cross-sectional view of the first embodiment clothing assembly.

FIGS. 20 and 21 show clothing assembly 300 according to the present invention including: vest front 302; vest shoulder straps 304; strap securement device 306; strap 308; and quick disconnect device 320. Quick disconnect device 320 includes: ball-receiving recess 326; narrowing channel 328; user actuation member 324; and strap-receiving loop 330.

Although FIG. 20 shows the quick disconnect device attached to the front of a bullet, stab and ballistic resistant vest, other articles of clothing may be attached to the quick disconnect device. At least for some clothing-mounted applications of the present invention, it is preferred that the article of clothing and the connection between the quick disconnect device and the article of clothing be such that the weight of the EET is distributed over a relatively large area of the user's body. This can prevent the problem encountered with slings where the sling strap uncomfortably rubs the shoulder of the user because the forces created by the weight of the long gun are communicated through a relatively small area on the user's shoulder.

The location of the quick disconnect device on the user's clothing should also be convenient. For example, putting a quick disconnect device at the ankle portion of a user's boot would likely interfere greatly with walking or running and would therefore not be preferred. On the other hand, attachment to a utility belt is a preferred arrangement according to the present invention, both from a comfort perspective and a absence-of-interference perspective.

Sometimes the location on the clothing where the quick disconnect device is mounted may matter. For example, a quick disconnect device mounted to the side of a helmet, over the user's temple, might cause a high degree of force through the user's chinstrap and on a narrow portion of the user's chin. On the other hand, if the quick disconnect device is mounted to the top of the helmet, this might result in the weight being transmitted over a larger, and more appropriate, portion of the user's body surface.

The front of the vest mounting shown in FIG. 20 is thought to be advantageous not only because it tends to distribute weight of the EET over a large, and appropriate, area of the user's body, but for other reasons, as well, that will now be discussed. One advantage is that most long guns will rotate, in the longitudinal plane of the long gun and about the central axis of the stem, in the R1 direction to a position where the barrel is pointing directly downwards, under the forces of gravity. This is because the weight of the ling gun on the barrel side is generally greater than the weight on the stock side. It is good for the barrel to tend to point downward in case there is some kind of unintended firing of the long gun. As a further advantage, the long gun can be rotated to a low ready position by the user: (i) without releasing the long gun; and (ii) while the long gun-s weight is still being supported, at least in large part, through the vest (rather than by the user's hand and arm). It is further believed that the long gun can even be safely fired, without releasing from the quick disconnect) from a crouching type position when the quick disconnect is attached to the vest in approximately the location shown in FIG. 20 (for a right-handed person). As one more advantage, user actuation member 324 will be located between the stock of the long gun and the user's body when the long gun is attached. This makes it more difficult for suspects and enemies to find and manipulate the user actuation mechanism and take adverse control of the long gun.

There are many possible ways to mount quick disconnect devices according to the present invention to clothing. One not-necessarily-preferred way is shown in FIGS. 20 and 21 where a simple strap 308 is run through a loop 330 that is mounted to the back of the back plate of device 320. In preferred embodiments MOdular Lightweight Load-carrying Equipment ("MOLLE") type connection hardware is used to connect the quick disconnect device to clothing, similar to the way pouches are conventionally connected to vests in the U.S. military. As shown in FIGS. 20 and 21, strap 308 and loop 330 are respectively mounted so that the insertion channel of the quick disconnect device will be inclined at angle A1 (preferably about 45 degrees) from the horizontal. This has been found to be a good angle for user convenience and the promotion of quick action.

As a final note on the clothing mounted embodiments of the present invention, it is noted that there may be some translational and/or rotational play in the clothing itself and/or in the connection between the clothing and the quick disconnect device. One might wonder why it can be advantageous to limit translational "play" in clothing-mounted embodiments of the present invention. However, the play allowed by at least some tactical clothing, such as a bullet-proof vest, is relatively small and/or resistant (rather than free). Therefore, even when taking the "play" allowed by mounting to pliable or flexible clothing, there will still be a relatively more secure connection, as compared with arrangements where the long gun is held by a conventional pliable sling.

Figure 22:
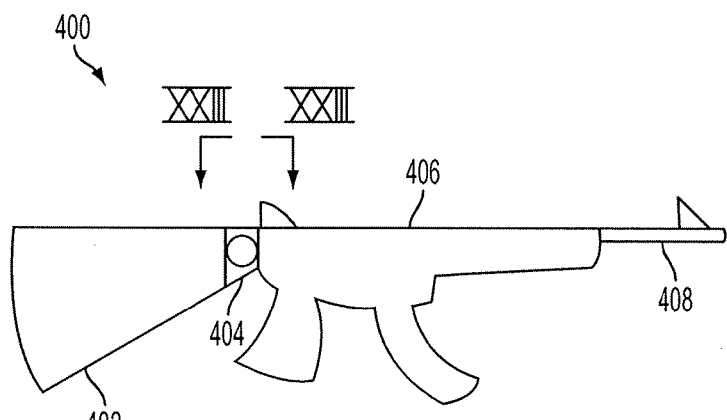
FIG. 22 is a side orthographic view of a long gun style EET equipped for use with the present invention.
Figure 23:
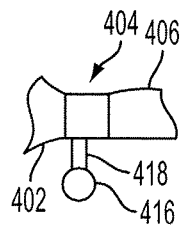
FIG. 23 is a top orthographic view of a portion of the FIG. 22 long gun style EET.

FIGS. 22 and 23 show long gun style EET sub-assembly 400 which is suitable for use in quick connect assemblies of the present invention. Sub-assembly 400 includes: stock 402; stock bearing plate sub-assembly 404 (including stem 418 and ball 416); receiver sub-sub-assembly 406 and barrel 408.

DEFINITIONS

Any and all published documents mentioned herein shall be considered to be incorporated by reference, in their respective entireties. The following definitions are provided for claim construction purposes:

Present invention: means "at least some embodiments of the present invention," and the use of the term "present invention" in connection with some feature described herein shall not mean that all claimed embodiments (see DEFINITIONS section) include the referenced feature(s).

Embodiment: a machine, manufacture, system, method, process and/or composition that may (not must) be within the scope of a present or future patent claim of this patent document; often, an "embodiment" will be within the scope of at least some of the originally filed claims and will also end up being within the scope of at least some of the claims as issued (after the claims have been developed through the process of patent prosecution), but this is not necessarily always the case; for example, an "embodiment" might be covered by neither the originally filed claims, nor the claims as issued, despite the description of the "embodiment" as an "embodiment."

First, second, third, etc. ("ordinals"): Unless otherwise noted, ordinals only serve to distinguish or identify (e.g., various members of a group); the mere use of ordinals shall not be taken to necessarily imply order (for example, time order, space order).

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

quick disconnect: quick disconnect refers to a detachably attachable mechanical connection where the detachment operation can be performed without the aid of tools; while mechanical connections that can generally be detached without the aid of tools are generally disconnect, mechanical disconnections that require the operation of a combination lock, or other manipulations comparable in difficulty are not considered as "quick disconnect."

elongated emergency tool: generally refers to elongated tools used in common emergency situations like a firefighter's axe or a long gun; while most elongated emergency tools can be used as deadly weapons, there may be elongated emergency tools that are not weapons, such a collapsed configuration of an emergency medical stretcher.

long gun: includes, but is not necessarily limited to, guns that are considered as long guns for police and/or military purposes, other similarly elongated portable launchers of other projectiles (for example, elongated, portable tear gas canister launchers), elongated tranquilizer guns, etc.

clothing: any human wearable article; most clothing is at least somewhat pliable, or at least includes a pliable portion, such as a helmet with a pliable chinstrap.

translational play: mechanical connections that are capable of substantial relative movement in at least one linear direction; for example, a conventional rifle sling forms a mechanical connection that allows translational play because the flexible and pliable strap allows for linear movement between the user's clothing and her long gun.

ball-and-stem structure: any structure that extends, and is elongated, in a direction away from a major surface of an EET and has: (i) a stem portion that has a relatively narrow cross-section relative to the direction of elongation of the ball-and-stem structure, and (ii) a ball portion located at the distal end of the stem, which ball portion includes a transverse cross section who's footprint transverse to the axis of elongation expands beyond the transverse cross-sections of the stem (at least for the portion of the stem that is proximate to the ball portion); neither the ball portion, nor the stem portion, must be rounded or curved (for example, the stem could be in the shape of a square prism and the ball could be in the shape of a cube); in preferred embodiments the ball will be radially symmetric about the central axis of the stem, but this is not necessarily required; in preferred embodiments, the central axis of the elongated stem will be perpendicular to the direction of elongation of the EET to which it is fixed, but this is not necessarily required; the direction of elongation of the stem must not be parallel to the direction of elongation of the EET in the manner that the direction of elongation of the rail of a long gun is parallel to the direction of elongation of the long gun.

Unless otherwise explicitly provided in the claim language, steps in method or process claims need only be performed that they happen to be set forth in the claim only to the extent that impossibility or extreme feasibility problems dictate that the recited step order be used. This broad interpretation with respect to step order is to be used regardless of alternative time ordering (that is, time ordering of the claimed steps that is different than the order of recitation in the claim) is particularly mentioned or discussed in this document. Any step order discussed in the above specification, and/or based upon order of step recitation in a claim, shall be considered as required by a method claim only if: (i) the step order is explicitly set forth in the words of the method claim itself; and/or (ii) it would be substantially impossible to perform the method in a different order. Unless otherwise specified in the method claims themselves, steps may be performed simultaneously or in any sort of temporally overlapping manner. Also, when any sort of time ordering is explicitly set forth in a method claim, the time ordering claim language shall not be taken as an implicit limitation on whether claimed steps are immediately consecutive in time, or as an implicit limitation against intervening steps.

What is claimed is:

1. A clothing assembly wearable by a user and for use with an elongated emergency tool (EET) including an EET connecting portion, the assembly comprising:
    an article of clothing comprising a mounting portion;
    a quick disconnect device, the quick disconnect device comprising:
    a front plate;
    a back plate;
    an intermediate plate positioned between said front plate and said back plate, the intermediate plate defining a vertically-extending user actuation lever channel, a laterally-extending guide channel, a vertically-extending ball-entry channel, and a ball-capturing recess disposed at a lower end of the ball-entry channel, wherein said actuation lever channel, guide channel, ball-entry channel, and ball-capturing recess are in communication and wherein the guide channel extends between the lever channel and the ball-entry channel;
    a thumb-driven user actuation lever positioned at least partially within said user actuation lever channel, wherein said user actuation lever is configured to move between a locking position in which lateral movement of the actuation lever within the lever channel is inhibited, an intermediate position, and an unlocked position, and further wherein said user actuation lever is biased in said locking position, and is biased against said unlocked position;
    a force transfer member positioned within said lever channel and said guide channel, wherein said force transfer member is configured to move between a first position and a second position;
    a ball-entry member positioned at least partially within said guide channel and said ball-entry channel, and defining an angular protrusion and a ball release opening adjacent to said angular protrusion, wherein said ball-entry member is configured to move between a first, ball-locked position and a second, ball-unlocked position, said angular protrusion blocking said ball-capturing recess when said ball-entry member is in said first position, and said ball release opening allowing access to said ball-capturing recess when said ball-entry member is in said second position, further wherein said ball-entry member is biased in said first position;
    wherein said ball-entry member is moved into the second, ball-unlocked position by applying a first, upward pressure on said user actuation lever to move the user actuation lever vertically within the lever channel against its bias from the locking position to the intermediate position such to enable lateral movement of the actuation lever within the lever channel, and then applying a second, inward lateral pressure on said user actuation lever to move the user actuation lever laterally within the lever channel from the intermediate position to the unlocked position, wherein moving the user actuation lever from the intermediate position to the unlocked position pushes the force transfer member laterally within the lever channel and guide channel into said second position, which pushes said ball-entry member laterally within the guide channel into said second, ball-unlocked position; and
    a first connection hardware set configured to rigidly mechanically connect the quick disconnect device to the mounting portion.

2. The assembly of claim 1 wherein:
    the article of clothing is a vest; and
    the first connection hardware set comprises modular lightweight load-carrying equipment (MOLLE) connection hardware.

3. A quick disconnect device, the quick disconnect device comprising:
    a front plate;
    a back plate;
    an intermediate plate positioned between said front plate and said back plate, the intermediate plate defining a vertically-extending user actuation lever channel, a laterally-extending guide channel, a vertically-extending ball-entry channel, and a ball-capturing recess disposed at a lower end of the ball-entry channel, wherein said actuation lever channel, guide channel, ball-entry channel, and ball-capturing recess are in communication and wherein the guide channel extends between the lever channel and the ball-entry channel;
    a thumb-driven user actuation lever positioned at least partially within said user actuation lever channel, wherein said user actuation lever is configured to move between a locking position in which lateral movement of the actuation lever within the lever channel is inhibited, an intermediate position, and an unlocked position, and further wherein said user actuation lever is biased in said locking position, and is biased against said unlocked position;
    a force transfer member positioned within said lever channel and said guide channel, wherein said force transfer member is configured to move between a first position and a second position;
    a ball-entry member positioned at least partially within said guide channel and said ball-entry channel, and defining an angular protrusion and a ball release opening adjacent to said angular protrusion, wherein said ball-entry member is configured to move between a first, ball-locked position and a second, ball-unlocked position, said angular protrusion blocking said ball-capturing recess when said ball-entry member is in said first position, and said ball release opening allowing access to said ball-capturing recess when said ball-entry member is in said second position, further wherein said ball-entry member is biased in said first position;
wherein said ball-entry member is moved into the second, ball-unlocked position by applying a first, upward pressure on said user actuation lever to move the user actuation lever vertically within the lever channel against its bias from the locking position to the intermediate position such to enable lateral movement of the actuation lever within the lever channel, and then applying a second, inward lateral pressure on said user actuation lever to move the user actuation lever laterally within the lever channel from the intermediate position to the unlocked position, wherein moving the user actuation lever from the intermediate position to the unlocked position pushes the force transfer member laterally within the lever channel and guide channel into said second position, which pushes said ball-entry member laterally within the guide channel into said second, ball-unlocked position.

* * * * *